US012620027B2

(12) United States Patent
Singh et al.

(10) Patent No.: US 12,620,027 B2
(45) Date of Patent: May 5, 2026

(54) MESSAGE TRANSMISSION TIMING OPTIMIZATION

(71) Applicant: Chicago Mercantile Exchange Inc., Chicago, IL (US)

(72) Inventors: Inderdeep Singh, Palatine, IL (US); Frederic Cedric Malabre, Middletown, NJ (US); Ari L. Studnitzer, Northbrook, IL (US); David John Geddes, Belfast (GB)

(73) Assignee: Chicago Mercantile Exchange Inc., Chicago, IL (US)

( * ) Notice: Subject to any disclaimer, the term of this patent is extended or adjusted under 35 U.S.C. 154(b) by 830 days.

(21) Appl. No.: 17/231,442

(22) Filed: Apr. 15, 2021

(65) Prior Publication Data

US 2021/0233174 A1 Jul. 29, 2021

Related U.S. Application Data

(63) Continuation of application No. 15/889,751, filed on Feb. 6, 2018, now Pat. No. 11,023,969.

(51) Int. Cl.
G06Q 40/04 (2012.01)
G06N 20/00 (2019.01)

(52) U.S. Cl.
CPC .............. *G06Q 40/04* (2013.01); *G06N 20/00* (2019.01)

(58) Field of Classification Search
CPC ...... G06Q 40/04; G06Q 10/10; G06Q 20/381; G06Q 40/00; G06Q 40/02; G06Q 40/03; G06Q 40/06; G06Q 40/08; G06N 20/00; G06N 5/02

USPC .......................................................... 705/37
See application file for complete search history.

(56) References Cited

U.S. PATENT DOCUMENTS

| | | | | |
|---|---|---|---|---|
| 10,181,032 B1* | 1/2019 | Sadaghiani | ........... | G06F 21/552 |
| 10,614,501 B2* | 4/2020 | Fredrich | ........... | G06Q 30/0625 |
| 2002/0128952 A1* | 9/2002 | Melkomian | ........... | G06Q 40/04 |
| | | | | 705/37 |
| 2003/0069830 A1* | 4/2003 | Morano | ................. | G06Q 40/04 |
| | | | | 705/37 |
| 2005/0216384 A1* | 9/2005 | Partlow | ................. | G06Q 40/06 |
| | | | | 705/35 |
| 2006/0036531 A1* | 2/2006 | Jackson | ............... | G06Q 20/042 |
| | | | | 705/37 |
| 2006/0080208 A1* | 4/2006 | Harrison | ................ | G06Q 40/04 |
| | | | | 705/37 |
| 2006/0143099 A1* | 6/2006 | Partlow | ................. | G06Q 40/06 |
| | | | | 705/35 |
| 2007/0192232 A1* | 8/2007 | Czupek | ................. | G06Q 40/04 |
| | | | | 705/37 |

(Continued)

OTHER PUBLICATIONS

Extended European Search Report in European Patent Application No. 19 15 5364, dated Jun. 25, 2019, 11 pages.

(Continued)

*Primary Examiner* — Slade E Smith
(74) *Attorney, Agent, or Firm* — Lempia Summerfield Katz LLC

(57) ABSTRACT

Systems and methods are provided for message transmission timing optimization. The system receives a large market disrupting transaction and provides a transaction placement strategy that splits up the transaction to maximize favorable execution value and minimizes time required to execute the entire transaction.

13 Claims, 5 Drawing Sheets

(56) References Cited

U.S. PATENT DOCUMENTS

| | | | | |
|---|---|---|---|---|
| 2008/0177675 A1* | 7/2008 | Arginteanu | G06Q 40/06 | 705/36 R |
| 2009/0150273 A1* | 6/2009 | Lehman | G06Q 40/04 | 705/35 |
| 2009/0234767 A1* | 9/2009 | Steidlmayer | G06Q 40/00 | 705/37 |
| 2010/0174633 A1* | 7/2010 | Milne | G06Q 40/04 | 705/37 |
| 2010/0205113 A1* | 8/2010 | Bauerschmidt | G06Q 40/08 | 705/37 |
| 2011/0295726 A1* | 12/2011 | Mueller | G06Q 40/06 | 705/37 |
| 2012/0072370 A1* | 3/2012 | Marcus | G06Q 40/04 | 705/37 |
| 2013/0036039 A1* | 2/2013 | Rohlfs | G06Q 40/04 | 705/37 |
| 2013/0218739 A1* | 8/2013 | Kmiec | G06Q 40/04 | 705/37 |
| 2013/0282554 A1* | 10/2013 | Boberski | G06Q 40/04 | 705/37 |
| 2014/0006243 A1* | 1/2014 | Boudreault | G06Q 40/04 | 705/37 |
| 2014/0019330 A1* | 1/2014 | Lerner | G06Q 40/03 | 705/37 |
| 2014/0067635 A1* | 3/2014 | Barker | G06Q 40/04 | 705/35 |
| 2014/0081818 A1* | 3/2014 | Co | G06Q 40/04 | 705/37 |
| 2014/0081820 A1* | 3/2014 | Farabi | G06Q 40/04 | 705/37 |
| 2014/0143123 A1* | 5/2014 | Banke | G06Q 40/04 | 705/37 |
| 2014/0180738 A1* | 6/2014 | Phillipps | G06N 20/10 | 705/7.38 |
| 2014/0279342 A1* | 9/2014 | Maynard | G06Q 40/04 | 705/37 |
| 2014/0330700 A1* | 11/2014 | Studnitzer | G06Q 40/04 | 705/37 |
| 2015/0026033 A1* | 1/2015 | Curran | G06F 16/24558 | 705/37 |
| 2015/0088720 A1* | 3/2015 | Acuna-Rohter | H04L 63/062 | 705/37 |
| 2015/0088723 A1* | 3/2015 | Acuna-Rohter | H04L 9/14 | 705/37 |
| 2015/0106260 A1* | 4/2015 | Andrews | G06Q 20/4016 | 705/39 |
| 2015/0127509 A1* | 5/2015 | Studnitzer | G06Q 40/04 | 705/37 |
| 2015/0127510 A1* | 5/2015 | Studnitzer | G06Q 40/04 | 705/37 |
| 2015/0127511 A1* | 5/2015 | Studnitzer | G06Q 40/04 | 705/37 |
| 2015/0127512 A1* | 5/2015 | Studnitzer | G06Q 40/04 | 705/37 |
| 2015/0127513 A1* | 5/2015 | Studnitzer | G06Q 40/04 | 705/37 |
| 2015/0127514 A1* | 5/2015 | Studnitzer | G06Q 40/04 | 705/37 |
| 2015/0127515 A1* | 5/2015 | Studnitzer | G06Q 40/04 | 705/37 |
| 2015/0127516 A1* | 5/2015 | Studnitzer | G06Q 40/06 | 705/37 |
| 2015/0154703 A1* | 6/2015 | Rohlfs | G06Q 40/04 | 705/37 |
| 2015/0161727 A1* | 6/2015 | Callaway | G06F 21/6245 | 705/37 |
| 2015/0221032 A1* | 8/2015 | Rohlfs | G06Q 40/04 | 705/37 |
| 2015/0262298 A1* | 9/2015 | Callaway | G06Q 40/04 | 705/37 |
| 2016/0042454 A1* | 2/2016 | Judson | G06Q 40/04 | 705/37 |
| 2016/0071017 A1* | 3/2016 | Adjaoute | G06Q 20/4016 | 706/52 |
| 2016/0086266 A1* | 3/2016 | Labuszewski | G06Q 40/04 | 705/37 |
| 2016/0086267 A1* | 3/2016 | Labuszewski | G06Q 40/04 | 705/37 |
| 2016/0086268 A1* | 3/2016 | Labuszewski | G06Q 40/04 | 705/37 |
| 2016/0092984 A1* | 3/2016 | Shontz | G06Q 40/04 | 705/37 |
| 2016/0092985 A1* | 3/2016 | Shontz | G06Q 40/04 | 705/37 |
| 2016/0104163 A1* | 4/2016 | Aquino | G06Q 20/4016 | 705/44 |
| 2016/0182414 A1* | 6/2016 | Mestanogullari | H04L 67/04 | 709/206 |
| 2016/0247065 A1* | 8/2016 | Nasle | G06N 5/02 | |
| 2016/0328796 A1* | 11/2016 | Acuña-Rohter | G06Q 40/04 | |
| 2016/0343080 A1* | 11/2016 | Weng | G06F 16/215 | |
| 2016/0364797 A1* | 12/2016 | Onallah | G06Q 40/04 | |
| 2017/0004575 A1* | 1/2017 | Repaka | H04L 12/1859 | |
| 2017/0018031 A1* | 1/2017 | Bandy | G06Q 40/04 | |
| 2017/0177808 A1* | 6/2017 | Irwin | G16H 40/63 | |
| 2017/0372318 A1* | 12/2017 | Shami | G06Q 20/405 | |
| 2018/0144389 A1* | 5/2018 | Fredrich | G06Q 30/0271 | |
| 2019/0028537 A1* | 1/2019 | Krishna Singuru | H04L 67/101 | |

OTHER PUBLICATIONS

Laura Noonan, "JPMorgan Develops Robot to Execute Trades", The Financial Times, Jul. 31, 2017, 2 pages, https://www.ft.com/content/16b8ffb6-7161-11e7-aca6-c6bd07df1a3c.

Maria Nikolova, "UBS' Latest AI Push May Lead to Robots Invading Trading World", FinanceFeeds.com, Industry News, Technology, Week in Review, Jul. 10, 2017, 10 pages, https://financefeeds.com/ubs-latest-ai-push-may-lead-robots-invading-trading-world/.

Michael Kearns et al., "Machine Learning for Market Microstructure and High Frequency Trading", High Frequency Trading—New Realities for Traders, Markets and Regulators, Jan. 1, 2013, 21 pages.

Nevmyvaka et al., "Reinforcement Learning for Optimized Trade Execution", Proceedings of the 23rd International Conference on Machine Learning, Jun. 25, 2006, pp. 673-680.

* cited by examiner

200

A110 — Identify disruptive incoming transaction

A120 — Identify state of the market

A130 — Generate predictions

A140 — Determine trade execution strategy

A150 — Generate smaller transaction

A160 — Execute smaller transaction

MESSAGE TRANSMISSION TIMING OPTIMIZATION

RELATED APPLICATIONS

This application is a continuation under 37 C.F.R. § 1.53(b) of U.S. patent application Ser. No. 15/889,751 filed Feb. 6, 2018, now U.S. Pat. No. 11,023,969, the entirety of which is incorporated by reference herein and relied upon.

BACKGROUND

A financial instrument trading system, such as a futures exchange, referred to herein also as an "Exchange", such as the Chicago Mercantile Exchange Inc. (CME), provides a contract market where financial products/instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time, referred to as the expiration date or expiration month. An option is the right, but not the obligation, to sell or buy the underlying instrument (in this case, a futures contract) at a specified price within a specified time. The commodity to be delivered in fulfillment of the contract, or alternatively, the commodity, or other instrument/asset, for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price.

Some products on an exchange are traded in an open outcry environment where the exchange provides a location for buyers and sellers to meet and negotiate a price for a quantity of a product. Other products are traded on an electronic trading platform (e.g., an electronic exchange), also referred to herein as a trading platform, electronic trading system, trading host or Exchange Computer System, where market participants, e.g. traders, use software to send orders to the trading platform. The order identifies the product, the quantity of the product the trader wishes to trade, a price at which the trader wishes to trade the product, and a direction of the order (i.e., whether the order is a bid, i.e. an offer to buy, or an ask, i.e. an offer to sell). It will be appreciated that there may be other order types or messages that traders can send including requests to modify or cancel a previously submitted order.

The speed in which trades are executed through electronic trading systems provide many benefits. Electronic trading systems can facilitate a large number of market transactions. The greater the number of market transactions, the greater a market's liquidity. In liquid markets, prices are driven by competition; prices reflect a consensus of an investment's value; and trading systems provide a free and open dissemination of information. With the advent of improved computational and communications capabilities, the speed and efficiency with which traders may receive information and trade in electronic trading systems has greatly improved. Algorithmic and high frequency trading utilize computers to quickly analyze market information and place trades allowing traders to take advantage of even the smallest movements in prices.

Unfortunately, this improved speed and efficiency also improves the speed at which problems may occur and propagate, such as where the market ceases to operate as intended, i.e. the market no longer reflects a true consensus of the value of traded products among the market participants. Such problems are typically evidenced by extreme market activity such as large changes in price, whether up or down, over a short period of time or an extreme volume of trades taking place.

In particular, traders, whether human or electronic, may not always react in a rational manner, such as when presented with imperfect information, when acting in a fraudulent or otherwise unethical manner, and/or due to faulty training or design. For example, while communications technologies may have improved, inequities in access to information and opportunities to participate still exist, which may or may not be in compliance with legislative, regulatory and/or ethical rules, e.g. some traders receive information before other traders, some traders may be able to place trader orders more quickly than others. In many cases, irrational trader behavior may be triggered by a market event, such as a change in price, creating a feedback look where the initial irrational reaction may then cause further market events, such as a continued price drop, triggering further irrational behavior and an extreme change in the price of the traded product in a short period of time. High speed trading exacerbates the problem as there may be little time for traders, or those overseeing them, to contemplate their reactions before significant losses may be incurred. Furthermore, improved communication among traders facilitates propagation of irrational behavior in one market to other markets as traders in those other markets react to the results of the irrational behavior.

Some integrity systems prevent undesirable changes in values over time or undesirable gaps between reference and received or incoming values. To mitigate risk and ensure a fair and balanced market, electronic trading systems need to provide mechanisms to rapidly detect and respond to situations where a market is not operating in a fair and balanced manner or otherwise where the market value is not reflective of a true consensus of the value of the traded products among the market participants. In addition, to ensure a fair and balanced market, electronic trading systems need to provide mechanisms that allow legitimate transactions to proceed.

DETAILED DESCRIPTION

Figure 1:
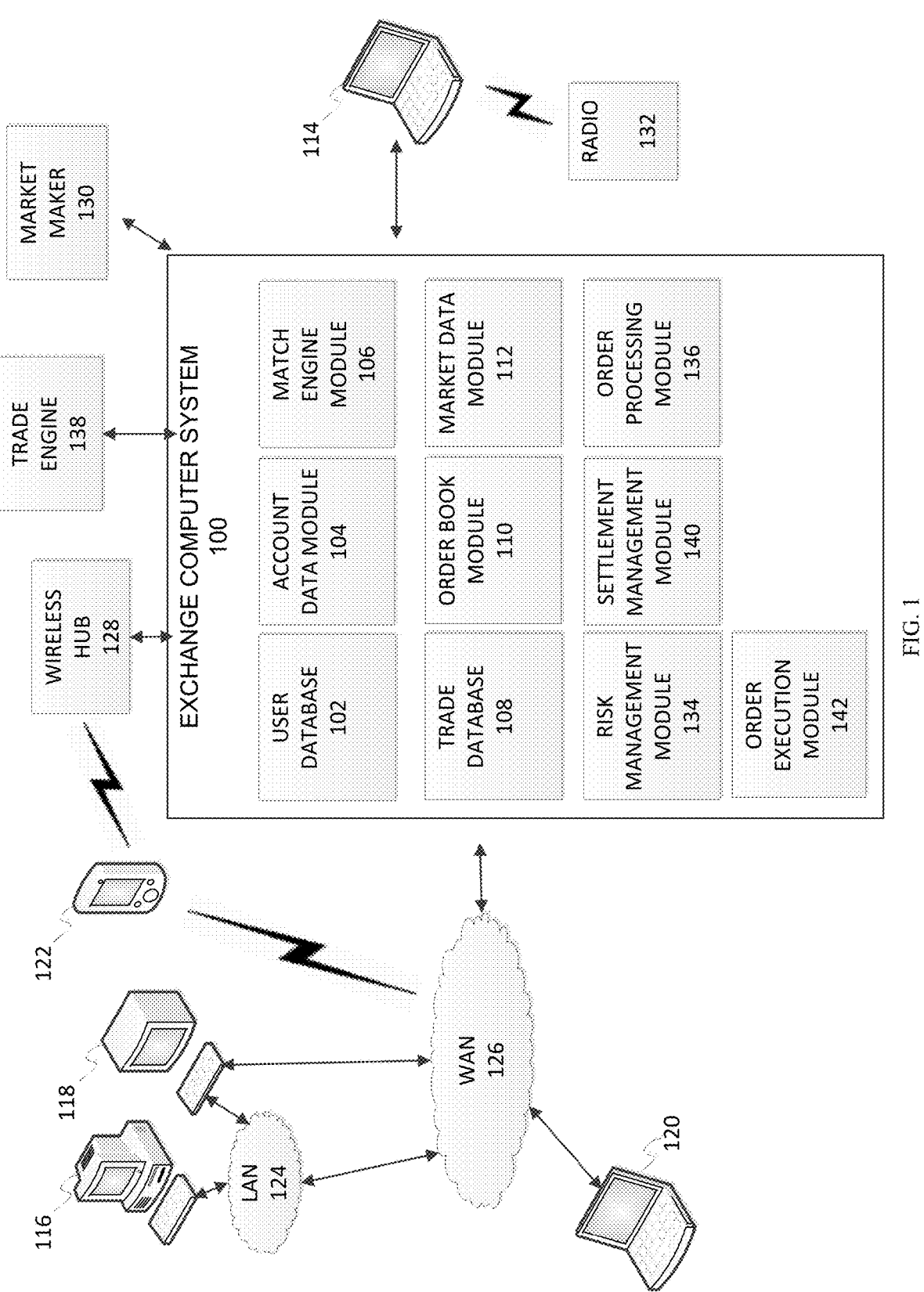
FIG. 1 depicts an illustrative computer network system that may be used to implement aspects of the disclosed embodiments.

The disclosed embodiments relate generally to a system that, in response to receiving a large market disrupting transaction, provides a transaction placement strategy that automatically splits up the transaction to maximize favorable execution value and minimize time required to execute the entire transaction. In addition to preventing disruptions in a data transaction processing system, large size transactions can often be traded in smaller lots more efficiently, rather than trying to trade in one large lot. The execution timing depends on the level of liquidity in the market and how quickly liquidity is restored by providers to move the value levels back to the previous fair market value. A machine learnt network using a large set of historic market data identifies optimal timing and sizing by predicting future market states in order to generate the transaction placement strategy.

When transacting in certain markets, large transactions have the potential to disrupt (e.g. cause a change in the electronic data transaction processing system that would exceed a predefined threshold) the market leading to unfavorable results for both the participants in the market and the specific participant that desires to place the large transaction. Different strategies have been used to limit the disruption. These strategies are "dumb" in that they cannot react to market conditions, they are randomized, and/or they are produce subpar results. One such strategy for placing a large transaction is an "iceberg" order. An iceberg order is a type of transaction placed by a participant on an exchange. Large retail traders and institutional traders often find themselves trying to buy and sell massive quantities of a single product. Gobbling up or dumping millions of shares of stock can single-handedly disrupt the market price of even a relatively liquid stock. For example, placing a single large sell order could easily trigger more selling as soon as the order shows up. An iceberg order attempts to hide the quantities from other participants. The total amount of the transactions is divided into a visible portion that is reported to other market participants, and a hidden portion, which is not. When the visible portion is filled, it is replaced by more product from the hidden portion. In this way, a market participant may be able to hide their intentions as opposed to placing the entire order on the market. Iceberg orders are dumb orders. An iceberg order may be able to randomly adjust the quantities to fool other participants, but the price does not change. If the market moves during the time the iceberg order is active, the participant may suffer. Iceberg orders may also be discovered and exploited by other participants in the market. Additionally, there are no timing considerations for an iceberg order. The iceberg order may rest for milliseconds or days depending on the market. Once the iceberg order is placed, it is a static dumb order.

Another method for placing or liquidating large orders is to attempt to spread the quantity over multiple exchanges. Systems exist that transmit portion of a large order simultaneously to multiple different exchanges. Breaking an order up over multiple exchanges may require planning and may fail if there is not enough product at the desired price or may result in snooping where another participant sees one order and then gets to the other exchanges first to bid up the price.

Another method for placing or liquidating large orders is to break up the large order into much smaller orders that are used to test the market. If, for example, the price bounces back, another slightly large order is transmitted until the market responds poorly or the large order is filled. Manually sending these smaller transactions may take time, effort, and may not result in an optimized return. Automatically transmitting these small transactions may fail to take advantage of market price swings (e.g. slippage or the market rising).

Each of these strategies may lead to poor outcomes for the participant attempting to place the large order. Additionally, mistakes may have catastrophic results for both the participant and the market as a whole. Selling a large quantity of product in the wrong way may lead to cascading market failures. Due to an increase in high-frequency trading, unexpected and distorting entries into a market may lead to unexpected and distorted results. Systems may be designed and implemented by an exchange to detect and respond to extreme market changes.

Some of these systems may respond by setting a hard price limit, i.e. minimum or maximum depending upon the direction of the extreme movement, only within which trades are allowed to occur, However, setting either a maximum or minimum price limit and continuing to allow trading may not address the underlying problem which caused the extreme market movement and the market may reverse and undergo an extreme movement away from the set limit, such as due to the reaction of algorithmic trading systems.

Other systems may be implemented to handle extreme market changes due to the execution of stop orders as, in a futures market that has few resting orders but many stop orders, an order executed at a limit price can cause a cascading execution of buy or sell stop orders. The triggering and election of these stop orders can seem almost instantaneous lowering the value of a market in just a few seconds. The problem may occur when one or more trades bring many stop orders into the market. A fast execution of these stop orders may prevent opposite side orders from entering the market, preventing buyers from competing against other buyers and sellers from competing against other sellers. See, for example, U.S. Pat. Nos. 8,103,576, 8,112,347, and 8,924,278, herein incorporated by reference in their entirety. However, extreme market moves can occur that are not precipitated by Stop Orders, thereby making such "Stop Price Logic" ineffectual.

The integrity systems in place may stop errant or erroneous orders but also may prevent legitimate transactions from being placed. Participants may be prevented by integrity systems from placing a transaction, may be forced to manually split the transaction which may also be rejected by integrity systems, or may be exploited by sophisticated market participants, all of which may lead to subpar outcomes for the participant.

The disclosed embodiments may be implemented to increase the stability and efficiency in the computational system while providing optimized results for a market participant. Embodiments provide, when presented with a market disrupting order, an intelligent trading strategy that benefits both the exchange though the increase in stability, and benefits the participant that placed the market disrupting order with optimized results. Generally, the disclosed embodiments automatically analyze whether any given incoming trade would disrupt the market above a certain threshold. If it would, then before the large order is processed, the system automatically breaks up the large order to minimize the impact on the market, while still maximizing favorable price and minimizing execution time.

The disclosed embodiments use historic market data and "market condition" data to train a machine learning network to predict the expected price movement based on the execution of an order of size X at price Y. The parameters of the historic market data and market condition data include the "shape" of data in a data structure that stores data relating to an order book for the market. The historic market data is pre-processed to identify the following shape characteristics: inside market width; volume at top of book; liquidity in the product group; time window of observation; last traded quantity; short term volatility; and cross product correlations—e.g. movements in parallel markets/products that influence price. The desired quantity units to trade per trade initiation is also used to train the machine learning network. The desired quantity units to trade per trade determines how the overall quantity is broken down into smaller chunks and how much a participant is willing to enter into the market at a time. The machine learnt network may then be used as a model to automatically break up market disrupting orders or to provide suggested strategies for participants that desire to enter large market disrupting orders.

While the disclosed embodiments may be described with reference to their applicability to electronic trading systems which trade futures contracts, and derivatives thereof, it will be appreciated that they may be applicable to any electronic trading system, e.g. which trade derivatives, equities or other products. It will be appreciated that a trading environment, such as a futures exchange as described herein, implements one or more economic markets where rights and obligations may be traded. As such, a trading environment may be characterized by need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counterorders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant participants are met, e.g. that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

One exemplary environment where detecting disrupting activity and providing optimized alternatives is desirable is in financial markets, and in particular, electronic financial exchanges, such as a futures exchange, such as the Chicago Mercantile Exchange Inc. (CME). A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting, and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles, and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as the debt obligations occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant may have a ripple effect on the solvency of the other participants. Conversely, CME's mark-to-the-market system does not allow losses to accumulate over time or allow a market participant the opportunity to defer losses associated with market positions.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the Exchange may further define the matching algorithm, or rules, by which incoming orders will be matched/allocated to resting orders.

Some products on an exchange are traded in an open outcry environment where the exchange provides a location for buyers and sellers to meet and negotiate a price for a quantity of a product. Other products are traded on an electronic trading platform (e.g., an electronic exchange), also referred to herein as a trading platform, electronic trading system, trading host or Exchange Computer System, where market participants, e.g. traders, use software to send orders to the trading platform. The order identifies the product, the quantity of the product the trader wishes to trade, a price at which the trader wishes to trade the product, and a direction of the order (i.e., whether the order is a bid, i.e. an offer to buy, or an ask, i.e. an offer to sell). It will be appreciated that there may be other order types or messages that traders can send including requests to modify or cancel a previously submitted order.

In particular, electronic trading of financial instruments, such as futures contracts, may be conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book/data structure may be typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product. A CLOB (Central Limit Order Book) may be a type of transparent order book system that matches customer orders.

In the exemplary embodiments, all transactions for a particular market may be ultimately received at the electronic trading system via one or more points of entry, e.g. one or more communications interfaces, at which the disclosed embodiments apply determinism, which as described may be at the point where matching occurs, e.g. at each match engine (where there may be multiple match engines, each for a given product/market, or moved away from the point where matching occurs and closer to the point where the electronic trading system first becomes "aware" of the incoming transaction, such as the point where transaction messages, e.g. orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g. matching, of those transactions/orders as will be described. See U.S. patent application Ser. No. 14/074,675, filed on Nov. 7, 2013, published as U.S. Patent Application Publication No. 2015/0127516, entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE", incorporated by reference herein.

Upon receipt of an incoming order to trade in a particular financial instrument, whether for a single component financial instrument, e.g. a single futures contract, or for multiple component financial instruments, e.g. a combination contract such as a spread contract, a match engine, as will be described in detail below, may attempt to identify a previously received but unsatisfied order counter thereto, i.e. for the opposite transaction (buy or sell) in the same financial instrument at the same or better price (but not necessarily for the same quantity unless, for example, either order specifies a condition that it must be entirely filled or not at all). Previously received but unsatisfied orders, i.e. orders which either did not match with a counter order when they were received, or their quantity was only partially satisfied, referred to as a partial fill, are maintained by the electronic trading system in an order book database/data structure to await the subsequent arrival of matching orders or the occurrence of other conditions which may cause the order to be removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e. to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e. market, in which it may be traded, in certain embodiments, each financial instrument, may be listed in alternative related order books. Accordingly, when an order for a financial instrument is received, it may be matched against a suitable counter order in its own order book or, possibly, against other suitable counter orders in the related order books. This is referred to as "implication" where a given order for a financial instrument may be matched via a combination of suitable counter orders for financial instruments which share common, or otherwise interdependent, financial variables.

The order for a particular financial instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." There may be numerous different implied matches identified which would allow the incoming order to be at least partially matched and mechanisms may be provided to arbitrate among them, such as by picking the implied match comprising the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed to appear available to trade in order to solicit the desired orders from the market participants. There may be numerous implied opportunities, the submission thereof, would allow the incoming order to be at least partially matched.

As was discussed above, electronic trading systems ideally attempt to offer an efficient, fair, and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

The disclosed embodiments may be applicable to contracts for any type of underlier, commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The methods and systems described herein may be integrated or otherwise combined with other various risk management methods and systems, such as the risk management methods and systems described in U.S. Pat. No. 7,769,667 entitled "System and Method for Activity Based Margining" (the '667 Patent"), the entire disclosure of which is incorporated by reference herein and relied upon. For example, the methods and systems described herein may be configured as a component or module of the risk management systems described in the above-referenced patent. Alternatively, or additionally, the disclosed methods may generate data to be provided to the systems described in the above-referenced patent.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the '667 Patent.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

It should be appreciated that the disclosed embodiments may use other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX Binary, FIX/FAST, or by an exchange-provided API.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop, or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market. A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant. The risk management module 134 may be coupled with an order execution module 142 that is configured to identify non-normal activity. The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios.

The order execution module 142 is included to generate an order execution strategy for splitting a large order into multiple smaller orders in order to limit market disruption and provide for execution of the smaller orders in the shortest time possible at the best execution price. The order execution strategy may be based on predictions derived from historical market and transaction data. The predictions may be generated by a machine learnt network that is trained on the historical market and transaction data to identify optimal order sizes and timing given a current market state.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user may interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for modeling participant activity.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
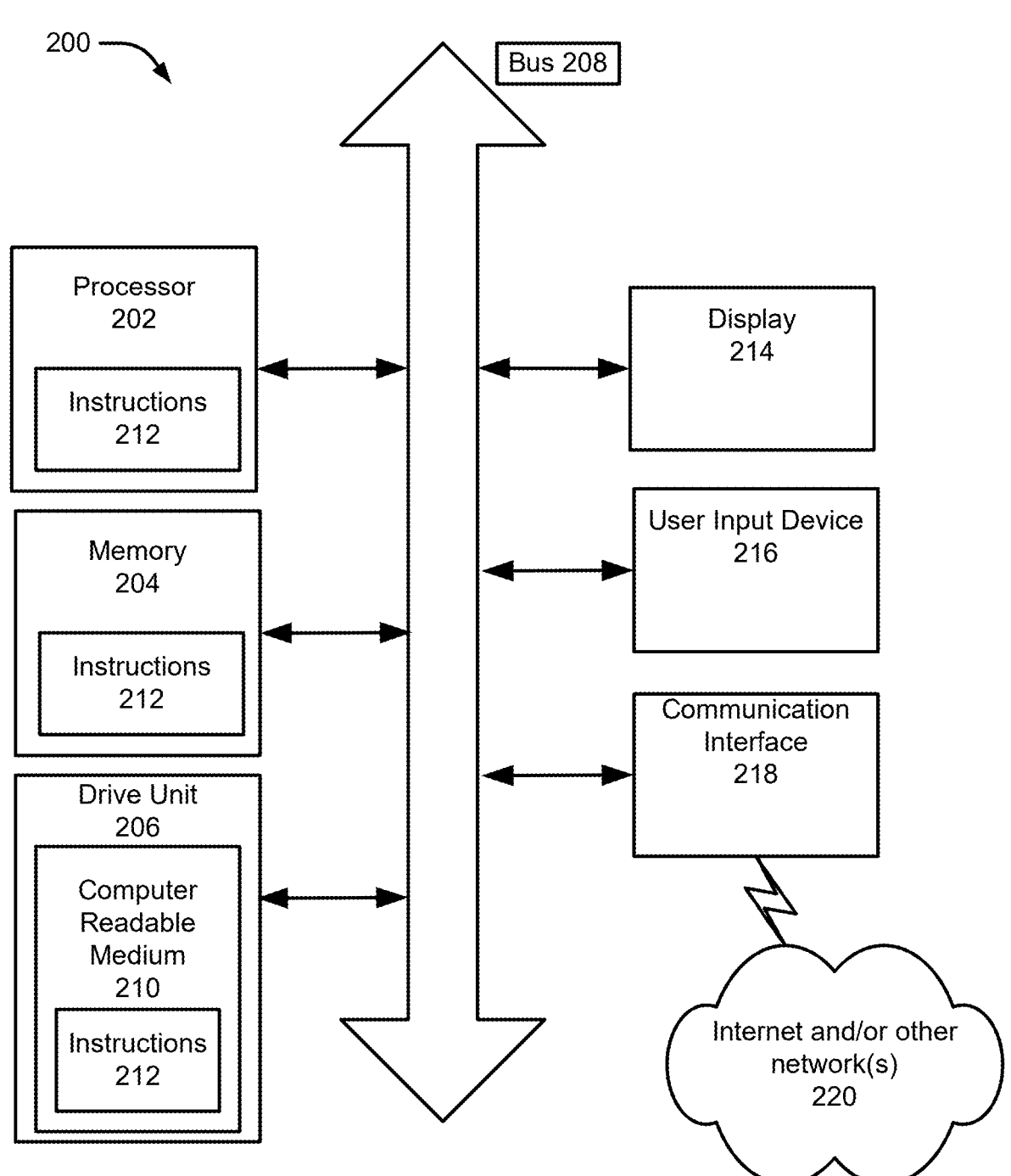
FIG. 2 depicts an illustrative embodiment of a general computer system for use with the disclosed embodiments.

Referring to FIG. 2, an illustrative embodiment of a general computer system 200 is shown. The computer system 200 may include a set of instructions that may be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, risk analysis, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 may be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that may communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, may be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 may communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, may be constructed to implement one or more of the methods described herein.

Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well. Feedback provided to the user may be any form of sensory feedback, e.g., visual feedback, auditory feedback, or tactile feedback. Input from the user may be received in any form, including acoustic, speech, or tactile input.

Embodiments of the subject matter described in this specification may be implemented in a computing system that includes a back end component, e.g., a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other. A system may depend on certain rules, logic, and inter-related objects and data. In technical and computing environments, a system may calculate values for multiple objects subject to rules, e.g., business or environment logic, associated with the objects. Certain object types may also depend on other object types.

Figure 3:
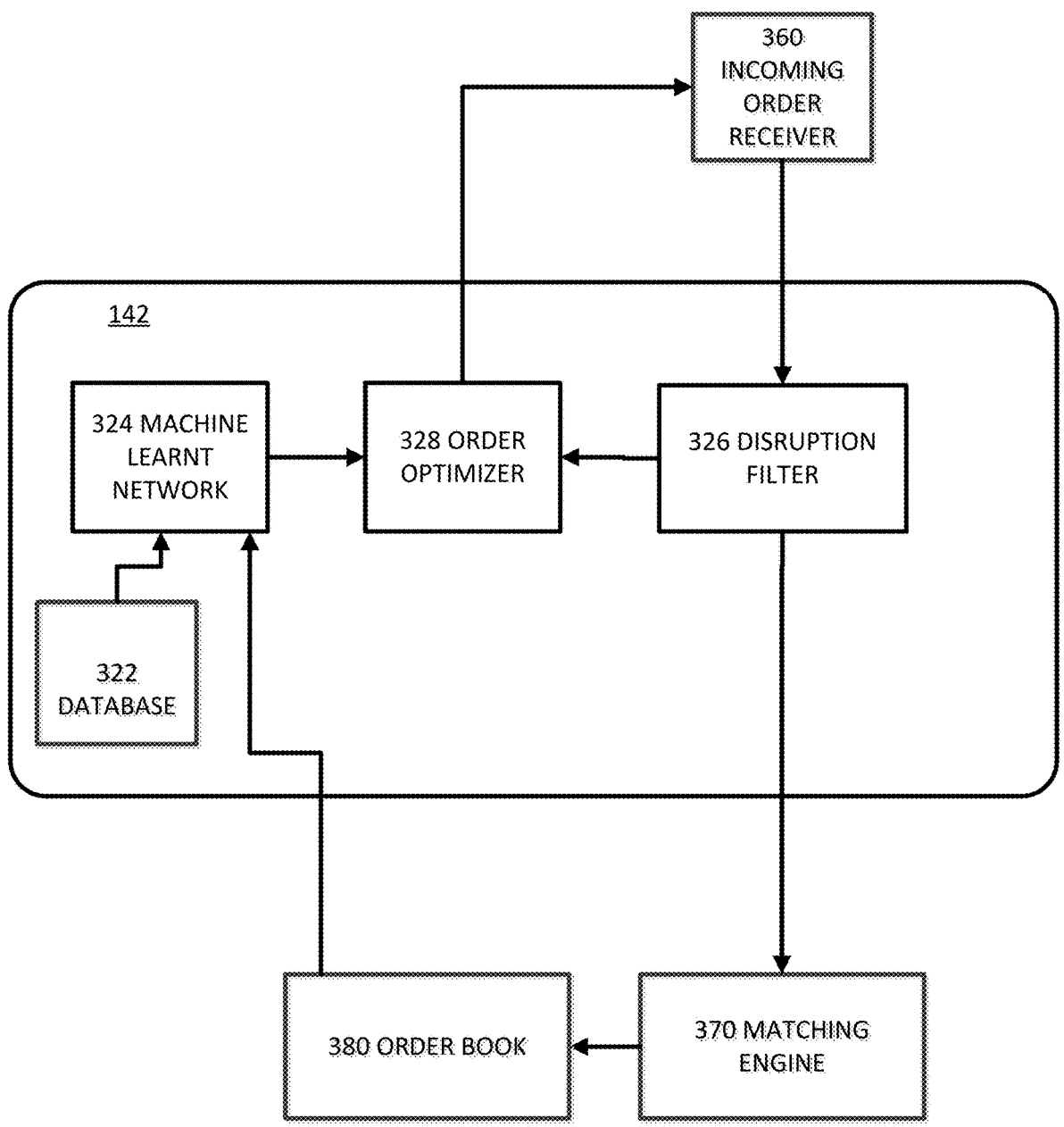
FIG. 3 depicts an illustrative example of an order execution module for use with the disclosed embodiments.

FIG. 3 depicts an illustrative embodiment of an order execution module 142. FIG. 3 includes a disruption filter 326, a machine learnt network 324, an order optimizer 328, and a database 322. The order execution module 142 may be connected to systems or machines outside the exchange system. FIG. 3 also depicts an incoming order receiver 360 that is configured to receive orders, a matching engine 370 that is configured to match order with previously received but unsatisfied order resting on an order book 380. The incoming order receiver 360, matching engine 370, and order book 380 may be implemented in one or more of the modules as depicted in FIG. 1. For example, the order book module 110 may implement the order book 380 and the match engine module 106 may implement the matching engine 370. The order execution module 142 may communicate with users, traders, and brokers outside of the exchange system, such as via wide area network 126 and/or local area network 124 and computer devices 114, 116, 118, 120 and 122. The order execution module 142 may be configured to monitor transactions, identify abnormal transaction, and generate an optimized strategy for splitting a disruptive order into smaller orders. The order execution module 142 may be configured to train a machine learnt network 324 using historical transaction and market data stored in a database 322.

The disruption filter 326 may be configured to identify transactions that will disrupt the market. A transaction that disrupts the market may be identified by comparing a size of the transaction to a predefined threshold. The predefined threshold may be determined by the machine learnt network 324, e.g. by learning which types of transactions that disrupt markets from historical market and transaction data. A disruption may be defined as a change in the state of the market that is outside of normal operations. A disruption may be a change in price or structure of the market that exceeds or deviates from a defined threshold change. A disruption may be a transaction that leads to other transactions that eventually disrupt the market. A market disruption may occur as a result of an event or group of events that are widely perceived as economically detrimental. The exchange may set thresholds or limits on trading activity, that if exceeded, indicate a market disruption. Existing mechanisms such as circuit breakers may be used to define a disruption. For example, market-wide circuit breakers kick in when the S&P 500 Index drops 7 percent (Level 1), 13 percent (Level 2), and 20 percent (Level 3) from the prior day's close. The disruptions of a market may be defined on a market by market basis. An exchange may define the conditions prior to opening or at any point during the day that would cause market disruptions. The conditions may include, for example, volatility during the previous day's trading session, trading in other markets before the open, substantial activity in the futures market before the open, the volume of pre-opening indications of interest, and government announcements.

The disruption filter 326 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the disruption filter 326 to, or otherwise be operative to identify disruptive transactions.

The database 322 (or historical market database 322) may be configured to store transaction data, market data, external data, or other characteristics that relate to the market or transaction that occur there within. The transaction data may include records of each transaction for a market over a period of time. The transaction data may be preprocessed to provide a normalized set of data for the machine learnt network 324 to be trained with. The database 322 may store calculated market characteristics for the market over time including inside market width; volume at top of book; liquidity in the product group; time window of observation; last traded quantity; short term volatility; and cross product correlations. The database 322 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the database 322 to, or otherwise be operative to store historical market data.

The machine learnt network 324 may be configured to identify one or more patterns in a set of historical market data. The machine learnt network 324 may be configured to predict an expected price movement based on an execution of an order of size X at price Y. The machine learnt network 324 may be configured to receive data from the database 322. The machine learnt network 324 may receive data directly from a network interface, the hardware machine engine, an order book 380, or other exchange module. The machine learnt network 324 may be configured to identify how an order of size X at price Y affects the market at a time Z when provided with a shape of the current market. To generate an accurate prediction, the machine learnt network 324 may be trained using a large data set. Training the machine learnt network 324 includes providing data to the network and adjusting weights. The machine learnt network 324 may be trained in a supervised manner or may be trained in an unsupervised manner. The machine learnt network 324 may be any type of machine learnt network 324. In an embodiment, the machine learnt network 324 is a structured neural network that includes a layered plurality of interconnected processing nodes. Each connection of the plurality of interconnected processing nodes to another may be dynamically weighted.

The machine learnt network 324 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the machine learnt network 324 to, or otherwise be operative to predict future states of a market as a result of an incoming transaction. The machine learnt network 324 may be a configured to identify patterns in historical transaction and market data stored in the database 322. The patterns may be used to predict future states of a market based given a current state and a potential incoming transaction.

The order optimizer 328 may be configured to receive an incoming order from the disruption filter 326 and generate an optimized execution strategy for splitting the incoming order, evaluating predicted results, and transmitting optimized smaller transactions to the exchange in order to be potentially matched. The execution strategy may define how (price, and quantity) and when (timing) the smaller transactions are transmitted to the exchange. The distribution and timing of the execution strategy may be based on predictions generated by the machine learnt network 324. For example, the machine learnt network 324, given the current state of the market, may be able to predict future states indicating how the market would react to certain sized and timed orders. Preferable predicted futures states may be identified by the order optimizer to generate an execution strategy that involves multiple smaller orders in a set amount of time. The order optimizer 328 may receive parameters for which the execution strategy is generated, for example, a desired return or desired time to complete. The parameters may affect the execution strategy as a shorter time to complete may result in larger portions of the disrupting order being transacted at a time resulting in a greater effect on the market.

The order optimizer 328 may be configured to update the execution strategy if the state of the market changes. For example, when a received transaction matches or rests, the execution strategy may be updated to reflect new predictions generated by the machine learnt network 324 based on the changes. In an embodiment, the execution strategy may provide a strategy that includes multiple potential transactions for a time window.

The order optimizer 328 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the machine learnt network 324 to, or otherwise be operative to generate an execution strategy for smaller portions of a larger order, the execution strategy configured to limit disruption, maximize return, and minimize time to execute.

Figure 4:
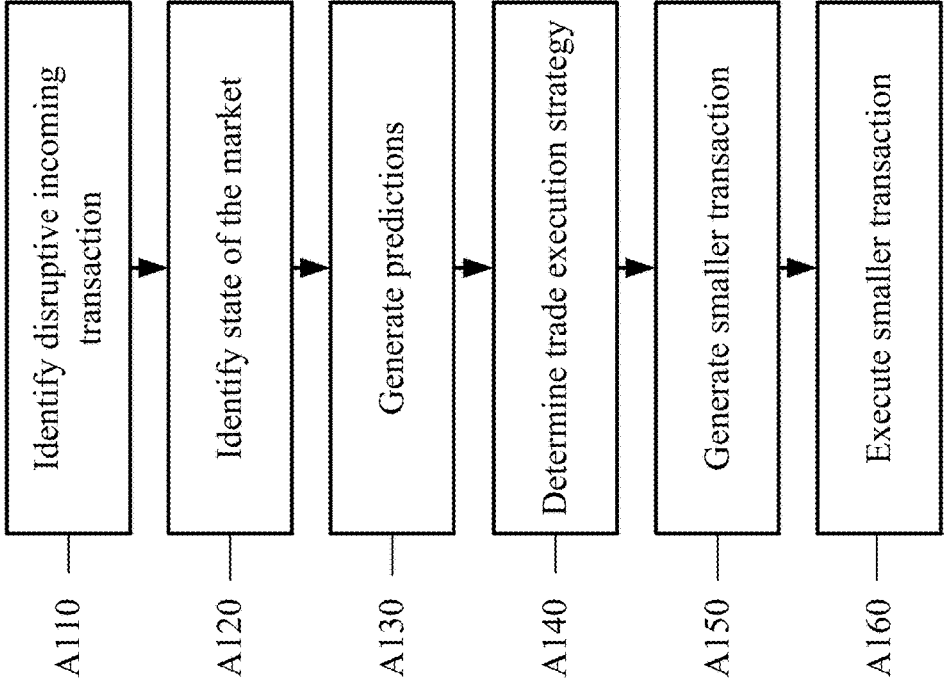
FIG. 4 depicts an example flowchart indicating a method of implementing the disclosed system for optimizing transaction timing in a data transaction processing system.

FIG. 4 depicts an example workflow of the operation of the order execution module 142 of FIG. 3. The workflow in FIG. 4 may be used to detect a disruptive incoming order and provide an execution strategy for breaking up the disruptive incoming order to diminish the disruption, maximize favorable execution price, and minimize a time required to execute the entire transaction.

At act A110, a disruption filter 326 determines that an incoming electronic data transaction request message would disrupt the electronic data transaction processing system. A disruption may be defined as an action that would disrupt the electronic data transaction processing system (market) by resulting in unexpected or unwanted results, for example, leading to price fluctuations outside a threshold range. A threshold for disruption may be defined based on the size, liquidity, or other parameters of the market. In an example, an order in a specific market that would sweep up three or more price layers in an order book 380 may be considered disrupting. In an embodiment, certain orders may be flagged for disruption based on a predetermined size limit. For example, certain markets may impose a limit on the size of a transaction. Any order that exceeds the size limit may be rejected. An order that includes a quantity above a predefined threshold, for example 300% or 500% of the average order size may be considered disrupting. Different thresholds may be used for different markets. Historical market data may be used to define the threshold.

In an embodiment, when a disrupting incoming electronic data transaction is identified, the disruption filter 326, order execution module 142, or incoming order receiver may notify the party attempting to place the order and offer to provide an execution strategy. The participant may select certain parameters to maximize/minimize or may allow the execution strategy and parameters to be determined by the order execution module 142. Alternatively, the order execution module 142 may automatically determine and implement the execution strategy.

At act A120, the order execution module 142 identifies a state of the current market. The state of the market may be defined by the identifying and classifying each of the previously received but unsatisfied electronic data transaction request messages, e.g. resting orders in the order book 380 for the market. Previously received but unsatisfied orders, i.e. orders which either did not match with a counter order when they were received, or their quantity was only partially satisfied, referred to as a partial fill, are maintained by the electronic trading system in an order book database/data structure to await the subsequent arrival of matching orders or the occurrence of other conditions which may cause the order to be removed from the order book 380.

The state or shape of the order book 380 may be described by one or more characteristics that quantify the previously received but unsatisfied electronic data transaction request messages stored in a memory. The characteristics may include an inside market width, a volume at top of book, a liquidity in the product group, and a last traded quantity, among other characteristics. The inside market width refers to the space (e.g. price levels) between the highest bid and the lowest ask at the top of the order book 380. The volume at the top of the order book 380 may refer to the quantity of the highest bid or the lowest ask. The volume at the top of the order book 380 may also refer to the book depth and how much quantity is rested at each price level. The liquidity in the product group refers to the availability of liquid assets in the market. The liquidity of a product can be measured as how often it is bought and sold. The last traded quantity refers to the last at least partially satisfied transaction that occurred in the market. Other data that may be identified or calculated may include external data such as short-term volatility and cross product correlations.

The state of the book may be a snapshot of a singular time or may be a dynamic view of a time period that includes a defined time window. For example, the state of the order book 380 may include events and characteristics for a period that starts at prior time T and continues to the present time. The state of the order book 380 may change as a result of each received transaction. As a result of a received transaction matching or resting, the characteristics may change as well.

At act A130, the order execution module 142 predicts, using a machine learnt network 324, an expected change in the state as a result of one or more incoming electronic data transaction request messages with one or more different parameters. Inputs to the machine learnt network 324 may include the state defined at act A120, the parameters of the entire order (e.g. total quantity), a desired quantity per trade, a desired time to execution, and a desired price among others. The machine learnt network 324 may be any type of machine learnt network 324. In an embodiment, the machine learnt network 324 is a neural network.

The machine learnt network 324 is trained on historical transaction data and historical market data to predict an expected price movement based on the execution of an order of size X at price Y. In an embodiment, the machine learnt network 324 identifies relationships between a historical state of the market, an historical transaction that either rests or matches, and a subsequent state of the market. Using this data, the machine learnt network 324 may adjust internal weights until the machine learnt network 324 is reliably able to predict the subsequent state of the market when given the current state and a transaction. The machine learnt network

324 may also use prior states of the market and prior transactions that lead up the transaction to generate a more accurate prediction. For example, the machine learnt network 324 may be taught that a sequence of transactions and resultant states may generate certain results.

The historical data may be collected over time for each individual market. The historical data may include data such as shape or state of the order book 380. The historic market data may be pre-processed before the historical market data is input to the machine learning network. The historical market and transaction data is normalized and pre-processed in a way that the machine learnt network 324 can easily focus on the relevant parts of the data. In an embodiment, the historical market and transaction data is pre-processed to identify the following shape characteristics: inside market width; volume at top of book; liquidity in the product group; time window of observation; and last traded quantity. The machine learnt network 324 may also take as an input a value for a desired quantity of units to trade per trade initiation. This value represent how possibilities of how the overall quantity is broken down into smaller chunks and how much quantity is entered into the market at a time. In addition, short term volatility and cross product correlations e.g. movements in parallel markets/products that influence price, may also be used to train the machine learnt network 324.

In an embodiment, the machine learnt network 324 is trained using sliding time windows. Market and transaction data from a time period may be used to predict a state for a future time period. A future state may result from a series of actions (transactions) that have been matched or rested. For example, actions taking place from T(−30) to T(−1) may influence the state of T(0), actions taking place from T(−40) to (T−11) may influence the state of T(10) and so on. Different lengths of time windows may be used. A longer time window may require additional processing resources or time to train the machine learnt network 324 due to the increase in data.

In an embodiment, the machine learnt network 324 is updated with newly received market and transaction data. The machine learnt network 324 may be trained prior to implementation in the order execution module 142. When new transaction and market data is acquired, the machine learnt network 324 may be updated or retrained.

The machine learnt network 324 may be any type of machine learnt network 324. The input data may further be preprocessed using machine learning techniques or other methods such as statistical analysis or decision trees that may be used to identify statistical similarity in the input data employing linear mathematical models or simple conditional logic. Data mining techniques may be used to identify relationships between the input data. Data mining techniques may be trained in an unsupervised or supervised manner.

For machine learning, support vector machines (SVMs, also support vector networks) may be used by the machine learnt network 324 to predict the future state of the market. SVMs provide supervised learning models with associated learning algorithms that analyze the input data used for classification and regression analysis. Alternative modeling systems may be used to train the machine learnt network 324 such as deep learning though neural networks or generative models. Deep machine learning may use neural networks to analyze the historical market data.

In an embodiment, the machine learnt network 324 is a structured neural network. Neural networks may include a collection of interconnected processing nodes. The connections between the nodes may be dynamically weighted. Neural networks learn relationships through repeated exposure to data and adjustment of the internal weights. Neural networks capture nonlinearity and interactions among independent variables without pre-specification.

In an embodiment, the machine learnt network 324 is a convolutional neural network. The layers in a convolutional neural network extract features from the input data. The deep learning learns features that are distinctive. Other techniques may be used with the convolutional neural network including backpropagation. Backpropagation is used to calculate the gradients of the error with respect to all weights in the network and use gradient descent to update all filter values/weights and parameter values to minimize the output error. The machine learnt network 324 may be trained by end to end backpropagation.

At act A140, the order execution module 142 generates, using the prediction, a transaction execution strategy that minimizes the disruption while maximizing and/or minimizing the one or more different parameters. The predictions may include multiple different scenarios that predict the resulting state of transacting different quantities at different prices. The predictions may also include predictions beyond the initial predictions. For example, the predictions may predict the result of secondary or tertiary transactions (e.g. after an initial transaction). From the predictions, the order execution module 142 generates a strategy that minimizes the disruption while maximizing the expected return and/or minimizing the expected time to complete the entire order. In an embodiment, the party that transmits the large order may provide one or more parameters such as requested return or requested time to complete. The trade execution strategy may include one or more potential smaller transactions to be placed at specific times. The trade execution strategy may be updated as each smaller transaction is executed, and the state market is changed.

At act A150, the order execution module 142 generates at least one electronic data transaction request messages that includes less quantity than the disruptive electronic data transaction request message based on the transaction execution strategy. A first electronic data transaction request message may include a quantity that is a smaller portion of the total quantity of the incoming electronic data transaction request message. The remaining quantity of the total quantity may be allocated to other future transactions or may be reserved until the result of the first electronic data transaction request message is identified. A price of the quantity in the first electronic data transaction request message may be determined at act A140 and included in the transaction execution strategy. Other conditions may also be included in the first electronic data transaction request message as determined by the transaction execution strategy. For example, an expiration time for the first electronic data transaction request message may be determined and included. If for example, the market slips, the order execution module 142 may identify the movement and update the transaction execution strategy.

The transaction execution strategy may not always provide the optimal execution return for an order. External factors such as unexpected transactions from other traders may prevent the strategy from being optimal. Additionally, the transaction execution strategy may be limited in the amount of time for execution of the entire strategy. For example, while an optimal strategy may involve spreading an order out over a longer time window, a party may request completion of the quantity in the entire order over a much shorter window. In certain markets, depending on the shape of the market, entering a large quantity of product in a short time may result in minor short term or even long-term distortions.

At act A160, the order execution module 142 provides a first electronic data request message of the two or more electronic data transaction request messages to the electronic data transaction processing system. The first electronic data request message may be treated as any other received transaction by the electronic data transaction processing system. The first electronic data request message may match (fully or partially) or may be rested on the order book 380. The results (either the match or resting) may be transmitted to the order optimizer.

The order execution module 142 may identify the state of the market as a result of the first electronic data request message and update the transaction execution strategy as needed. The order execution module 142 may receive feedback from each of the provided electronic data transaction request messages. As each provided electronic data transaction request messages match or rest, the subsequent state of the market may be feed back into the order execution module 142 to generate new predictions. In an example, the order execution module 142 may modify the first order or adjust the price or quantity of subsequent orders if the predictions from the machine learnt network 324 anticipate the market going up or down, for example, in the next few milliseconds. If the order execution module 142 predicts that the market will go up shortly but that a large transaction to sell may drive the price back down, the order execution module 142 may adjust the quantity and price of a potential transaction accordingly. Additionally, a transaction execution strategy may be back-tested by comparing orders by the trading strategy against historical market data.

Figure 5:
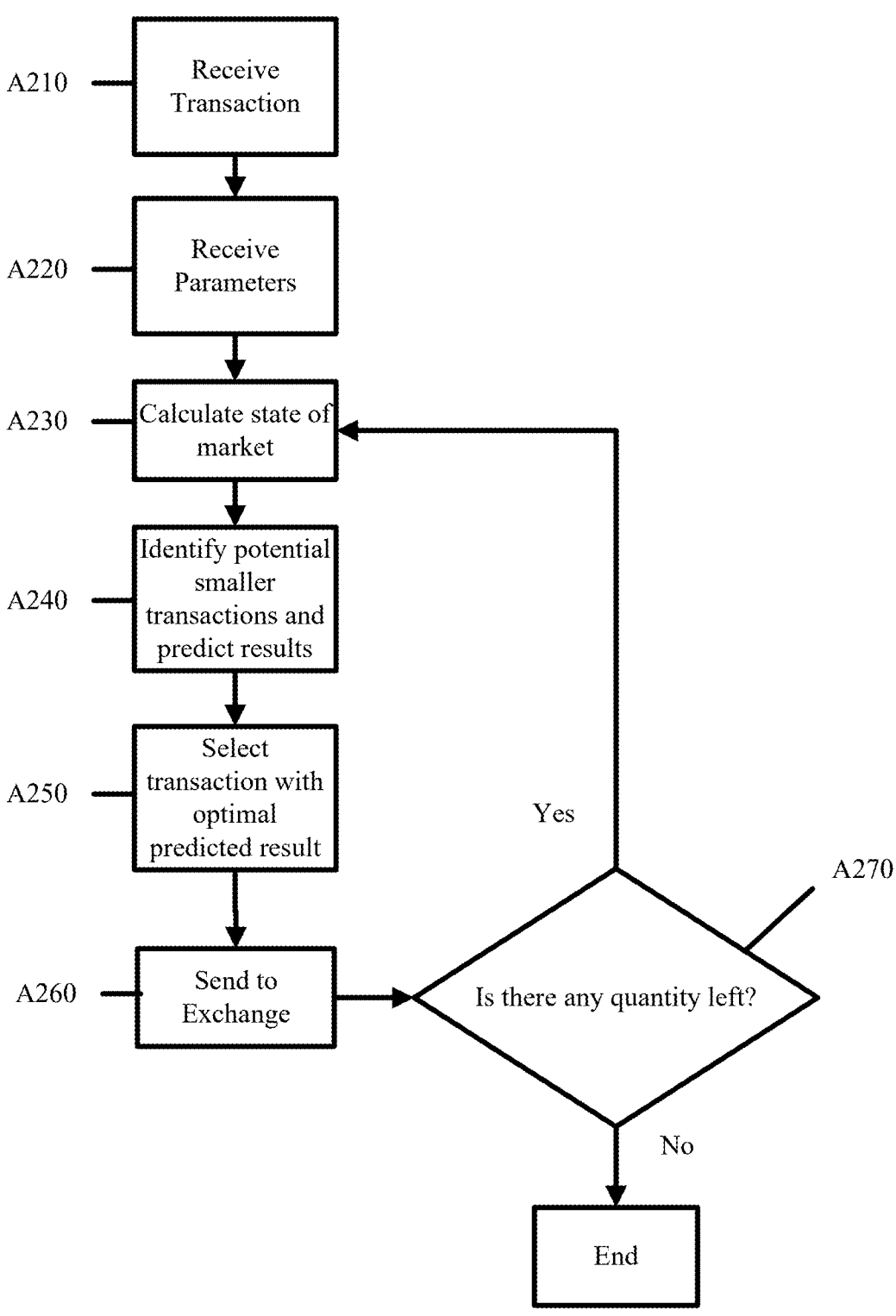
FIG. 5 depicts an example flowchart indicating a method of implementing the disclosed system for optimizing transaction timing in a data transaction processing system.

FIG. 5 depicts a workflow for optimizing message transmission as may be implemented with computer devices and computer networks, such as those described with respect to FIG. 1, 2, or 3. Embodiments may involve all, more or fewer actions indicated by the blocks of FIG. 5. The actions may be performed in the order or sequence shown or in a different sequence.

At act A210, a transaction is received. In an embodiment, the order execution module 142 may be provided to a market participant. A market participant may provide an order to the order execution module 142 prior to transmitting to an exchange. The market participant may test out different options prior to generating a message transmission strategy and transmitting the transactions.

At act A220, parameters for transacting the transaction are received. The parameters may be selected by the market participant and may include values for price, time, and other conditions relating to how the market participant desires the transaction to be broken up and transacted.

At act A230, the state of the market is calculated. The state or shape of the market may be described by one or more characteristics that quantify the order that is stored in a memory. The characteristics may include an inside market width, a volume at the top of the order book 380, a liquidity in the product group, and a last traded quantity, among other characteristics. The inside market width refers to the space (e.g. price levels) between the highest bid and the lowest ask at the top of the order book 380. The volume at the top of the order book 380 may refer to the quantity of the highest bid or the lowest ask. The volume at the top of the order book 380 may also refer to the book depth and how much quantity is rested at each price level. The liquidity in the product group refers to the availability of liquid assets in the market. The liquidity of a product can be measured as how often it is bought and sold. The last traded quantity refers to the last at least partially satisfied transaction that occurred in the market. Other data that may be identified or calculated may include external data such as short-term volatility and cross product correlations.

At act A240, the order execution module 142 identifies potential smaller transactions and timing considerations based on predictions of a machine learnt network 324. In an embodiment, the machine learnt network 324 is a structured neural network. Neural networks may be made up of a collection of interconnected processing nodes. The connections between the nodes may be dynamically weighted. Neural networks employ a technique of learning relationships through repeated exposure to data and adjustment of internal weights.

The machine learnt network 324 is trained (dynamically adjusted) by inputting historical market and transaction data and resultant states. The machine learnt network 324 "learns" to identify the impact of transactions on a market and how the market responds. The inputs to the machine learnt network 324 may include values that define the state of the market as described above. The inputs may be normalized to provide clean data for the machine learnt network 324 to input. In an embodiment, the historical market and transaction data is pre-processed to identify the following shape characteristics: inside market width; volume at top of book; liquidity in the product group; time window of observation; and last traded quantity. The inside market width refers to the space (e.g. price levels) between the highest bid and the lowest ask at the top of the book. The volume at the top of the book may refer to the quantity of the highest bid or the lowest ask. The volume at the top of the book may also refer to the book depth and how much quantity is rested at each price level. The liquidity in the product group refers to the availability of liquid assets in the market. The liquidity of a product can be measured as how often it is bought and sold. The last traded quantity refers to the last at least partially satisfied transaction that occurred in the market. The machine learnt network 324 may also take as an input a value for a desired quantity of units to trade per trade initiation. This value represent how possibilities of how the overall quantity is broken down into smaller chunks and how much quantity is entered into the market at a time. In addition, short term volatility and cross product correlations e.g. movements in parallel markets/products that influence price, may also be used to train the machine learnt network 324.

The machine learnt network 324 inputs a current state of the market and predicts the results of various transactions of size X at time Y. The results include the resulting state of the market and a prediction of whether the transactions will trade.

At act A250, the order execution module 142 selects a smaller transaction that provides optimal or desired results. The smaller transaction may be selected based on the predictions of act A240, e.g. whether the smaller transaction will trade and any affect that the smaller transaction will have on future market so that additional transactions may be entered that maximize return and timing. In an example, even though a first smaller transaction may be filled at a desired price, the impact may result in a state of the market that is unfavorable to future smaller transactions within a desired window resulting in a non-optimal outcome for transacting all the quantity in the initial transaction request.

At act A260, the smaller transaction is transmitted to the exchange. At act A270, if there is any quantity left, the process repeats starting at A230. If there is no quantity left, the process ends.

When applied to a financial exchange computer system, the embodiments described herein may utilize trade related electronic messages to enact trading activity in an electronic market. The trading entity and/or participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. As used herein, an exchange 100 includes a place or system that receives and/or executes orders.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:

preprocessing, by an order execution processor coupled with a database and a hardware matching processor, historical transaction and state data stored in the database to generate normalized historical transaction and state data defining a plurality of quantitative features;

training, by the order execution processor, using the normalized historical transaction and state data, a machine learnt network coupled therewith, based on identification of one or more patterns in the normalized historical transaction and state data indicative of expected changes in the historical transaction and state data as a result of the historical transaction data in an electronic data transaction processing system to generate a trained machine learnt network, wherein the trained machine learnt network is a structured neural network comprising a layered plurality of interconnected processing nodes, wherein each connection of the plurality of interconnected processing nodes to another is dynamically weighted, wherein the electronic data transaction processing system is operative to transact a plurality of data items via the hardware matching processor associated therewith that matches, as they are received, incoming electronic data transaction request messages, for one of the plurality of data items received over a data communication network with at least one other previously received but unsatisfied electronic data transaction request message counter thereto stored in a memory associated with the plurality of data items coupled with the hardware matching processor, to at least partially satisfy one or both of the incoming electronic data transaction request messages or the at least one other previously received electronic data transaction request message;

determining, by the order execution processor, using the trained machine learnt network, a predefined size threshold that would cause a change in the electronic data transaction processing system resulting in a disruption to the electronic data transaction processing system;

determining, by a disruption filter processor coupled with the order execution processor, using the trained machine learnt network, that an incoming electronic data transaction request message exceeds the predefined size threshold that would cause the change in the electronic data transaction processing system resulting in the disruption thereto;

predicting, by the order execution processor using the trained machine learnt network coupled therewith, based on an initial state of the electronic data transaction processing system, an expected change in the initial state as a result of one or more potential electronic data transaction request messages with one or more different parameters including at least a value and a transmission timing;

generating, by an order optimizer processor, based on the prediction from the trained machine learnt network, before the incoming electronic data transaction request message that exceeds the predefined size threshold is processed, a transaction execution strategy comprising one or more alternative electronic data transaction request messages based on the incoming electronic data transaction request message that mitigate the disruption while maximizing one of the one or more different parameters and minimizing another, different from the one parameter, of the one or more different parameters, each of the one or more alternative electronic data transaction request messages not exceeding the predefined size threshold, the one or more different parameters selected based on the predicted expected change to minimize queue saturation of the hardware matching processor and maintain deterministic order matching;

transmitting, by the order execution processor, the one or more alternative electronic data transaction request messages to the electronic data transaction processing system for processing in lieu of transmitting the incoming data transaction request message that exceeds the predefined size threshold; and processing, by the hardware matching processor, each of the one or more alternative electronic data transaction request messages in lieu of processing the incoming data transaction request message that exceeds the predefined size threshold based on the transaction execution strategy to dynamically control message flow and thereby improve operational stability, determinism, and throughput of the electronic data transaction processing system.

2. The computer implemented method of claim 1, further comprising:

predicting, by the order execution processor using the trained machine learnt network responsive to receipt of another incoming electronic data transaction request message and based on a subsequent state of the electronic transaction processing system, expected further changes in the subsequent state as a result of the one or more potential electronic data transaction request messages with the one or more different parameters;

generating, by the order optimizer processor using the prediction of the further expected changes, another alternative electronic data transaction request message that mitigates the disruption while maximizing the one parameter of the one or more different parameters and minimizing the other parameter of the one or more different parameters; and transmitting, by the order execution processor, the other alternative electronic data transaction request message to the electronic data transaction processing system.

3. The computer implemented method of claim 1, wherein the determining comprises:

comparing a quantity value of the incoming electronic data transaction request message with the predefined size threshold; and determining that the incoming electronic data transaction request message is disruptive based on the comparison.

4. The computer implemented method of claim 1, wherein the plurality of quantitative features comprises at least an inside market width, a volume at a top of a market, a liquidity in the market, and a time window of observation.

5. The computer implemented method of claim 1, wherein the generating of the one or more electronic data transaction request messages further comprises:

identifying a plurality of potential electronic data transaction request messages to be transacted sequentially within a time window, wherein the plurality of potential electronic data request messages together comprises a total quantity equal to a quantity stored in the incoming electronic data transaction request message, and wherein the plurality of electronic data transactions are identified based on the predictions to be transacted to maximize the value.

6. The computer implemented method of claim 5, wherein the plurality of electronic data transactions are further identified based on the predictions to minimize the timing.

7. A system comprising:

a database configured to store historical transaction and state data of an electronic data transaction processing system operative to transact a plurality of data items via a hardware matching processor associated therewith that matches, as they are received, incoming electronic data transaction request messages, for one of the plurality of data items received over a data communication network with at least one other previously received but unsatisfied electronic data transaction request message counter thereto stored in a memory associated with the plurality of data items coupled with the hardware matching processor, to at least partially satisfy one or both of the incoming electronic data transaction request messages or the at least one other previously received electronic data transaction request message;

an order execution processor coupled with the database, the order execution processor configured to:

preprocess the historical transaction and state data stored in the database to generate normalized historical transaction and state data defining a plurality of quantitative features;

train, using the normalized historical transaction and state data, a trained machine learnt network, by identifying one or more patterns in the normalized historical transaction and state data indicative of expected changes in the historical transaction and state data as a result of the historical transactions; and determine a first predefined size threshold that would exceed a second predefined size threshold that would cause a change in the electronic data system causing a disruption to the electronic data transaction processing system and predict a future state of the electronic data transaction processing system as a function of a current state of the electronic data transaction processing system and one or more potential electronic data transaction request messages of different parameters, wherein the trained machine learnt network is a structured neural network comprising a layered plurality of interconnected processing nodes, wherein each connection of the plurality of interconnected processing nodes to another is dynamically weighted;

a disruption filter processor configured to, based on predictions from the trained machine learnt network, identify that an incoming electronic data transaction request message exceeds the first predefined size threshold; and an order optimizer processor coupled with the trained machine learnt network and configured to, before the incoming electronic data transaction request message that exceeds the first predefined size threshold is processed, generate a transaction execution strategy comprising one or more alternative electronic data transaction request messages based on predictions by the trained machine learnt network, each of the one or more alternative electronic data transaction request messages not exceeding the first predefined size threshold, each of the one or more alternative electronic data transaction request messages maximizing one parameter and minimizing another parameter, different from the one parameter and not exceeding the first predefined size threshold, the one or more different parameters selected based on the predicted expected change to minimize queue saturation of the hardware matching processor and maintain deterministic order matching, wherein the order execution processor is further configured to transmit the one or more alternative electronic data transaction request messages to the electronic data transaction processing system for execution in lieu of transmission of the incoming data transaction request message, wherein the hardware matching processor of the electronic data transaction processing system is configured to execute the alternative electronic data transaction request messages in lieu of execution of the incoming data transaction request message that exceeds the first predefined size threshold based on the transaction execution strategy to dynamically control message flow and thereby improve operational stability, determinism, and throughput of the electronic data transaction processing system.

8. The system of claim 7, wherein the plurality of quantitative features comprises at least an inside market width, a volume at a top of a market, liquidity in the market, and a time window of observation.

9. A computer implemented method comprising:

preprocessing, by an order execution processor coupled with a database, historical transaction and state data stored in the database to generate normalized historical transaction and state data defining a plurality of quantitative features;

training, by the order execution processor, a machine learnt network coupled therewith, based on identification of one or more patterns in the normalized historical transaction and state data indicative of expected changes in the historical transaction and state data as a result of the historical transaction data in an electronic data transaction processing system to generate a trained machine learnt network, wherein the trained machine learnt network is a structured neural network comprising a layered plurality of interconnected processing nodes, wherein each connection of the plurality of interconnected processing nodes to another is dynamically weighted;

determining, by the order execution processor, using the trained machine learnt network, a predefined size threshold that would cause a change in the electronic data transaction processing system resulting in a disruption to the electronic data transaction processing system;

identifying, by a disruption filter processor, an incoming transaction which exceeds the predefined size threshold that would cause the change in the electronic data transaction processing system resulting in the disruption thereto;

predicting, by the order execution processor, using the trained machine learnt network, based on a calculated state of a data structure, an expected change in the state in the data structure for one or more potential transactions to be transacted at one or more values at one or more different times;

generating, by an order optimizer processor, before the incoming transaction that exceeds the predefined size threshold is executed, based on the predictions from the trained machine learnt network, a transaction execution strategy comprising one or more alternative transactions, each of the one or more alternative transactions not exceeding the predefined size threshold, wherein the one or more alternative transactions maximize an execution value and limits a time to transact, the execution value and the time to transact selected based on the predicted expected change to minimize queue saturation and maintain deterministic order matching;

transmitting, by the order execution processor, the one or more alternative transactions to a hardware matching processor of the electronic trading system for execution in lieu of transmission of the incoming transaction; and executing, by the hardware matching processor, the one or more alternative transactions in lieu of executing the incoming transaction that exceeds the predefined size threshold based on the transaction execution strategy to dynamically control message flow and thereby improve operational stability, determinism, and throughput of the electronic data transaction processing system.

10. The computer implemented method of claim 9, wherein the plurality of quantitative features comprises at least an inside market width, a volume at a top of a market, liquidity in the market, and a time window of observation.

11. The computer implemented method of claim 9, wherein the executing of the one or more alternative transactions further comprises transmitting the one or more alternative transactions to an electronic data transaction processing system in lieu of the incoming transaction.

12. A system comprising:

means for preprocessing historical transaction and state data stored in a database to generate normalized historical transaction and state data defining a plurality of quantitative features;

means for training a machine learnt network coupled therewith, based on identification of one or more patterns in the normalized historical transaction and state data indicative of expected changes in the historical transaction and state data as a result of the historical transaction and state data in an electronic data transaction processing system to generate a trained machine learnt network, wherein the trained machine learnt network is a structured neural network comprising a layered plurality of dynamically weighted interconnected processing nodes, wherein each connection of the plurality of interconnected processing nodes to another is dynamically weighted, wherein the electronic data transaction processing system is operative to transact a plurality of data items via a hardware matching processor associated therewith that matches, as they are received, incoming electronic data transaction request messages, for one of the plurality of data items received over a data communication network with at least one other previously received but unsatisfied electronic data transaction request message counter thereto stored in a memory associated with the plurality of data items coupled with the hardware matching processor, to at least partially satisfy one or both of the incoming electronic data transaction request messages or the at least one other previously received electronic data transaction request message;

means for determining, by the processor, using the trained machine learnt network, a predefined size threshold that would cause a change in the electronic data transaction processing system resulting in a disruption to the electronic data transaction processing system;

means for determining that an incoming electronic data transaction request message exceeds the predefined size threshold that would cause a change in the electronic data transaction processing system resulting in a disruption thereto;

means for predicting, using the trained machine learnt network, based on an initial state of the electronic data transaction processing system, an expected change in the initial state as a result of one or more potential electronic data transaction request messages with one or more different parameters including at least a value and a transmission timing;

means for generating based on the prediction from the trained machine learnt network, before the incoming electronic data transaction request message that exceeds the predefined size threshold is processed, a transaction execution strategy comprising one or more alternative electronic data transaction request messages based on the incoming electronic data transaction request message that mitigate the disruption while maximizing one of the one or more different parameters and minimizing another, different from the one parameter, of the one or more different parameters, each of the one or more alternative electronic data transaction request messages not exceeding the predefined size threshold, the one or more different parameters selected based on the predicted expected change to minimize queue saturation and maintain deterministic order matching;

means for transmitting the one or more alternative electronic data transaction request messages to the electronic data transaction processing system for processing in lieu of transmitting the incoming data transaction request message that exceeds the predefined size threshold; and means for processing, each of the one or more alternative electronic data transaction request messages in lieu of processing the incoming data transaction request message that exceeds the predefined size threshold based on the transaction execution strategy to dynamically control message flow and thereby improve operational stability, determinism, and throughput of the electronic data transaction processing system.

13. The system of claim 12, wherein the expected change in the state is predicted based on historical data comprising at least an inside market width, a volume at a top of a market, liquidity in the market, and a time window of observation.

\* \* \* \* \*